2,322,050

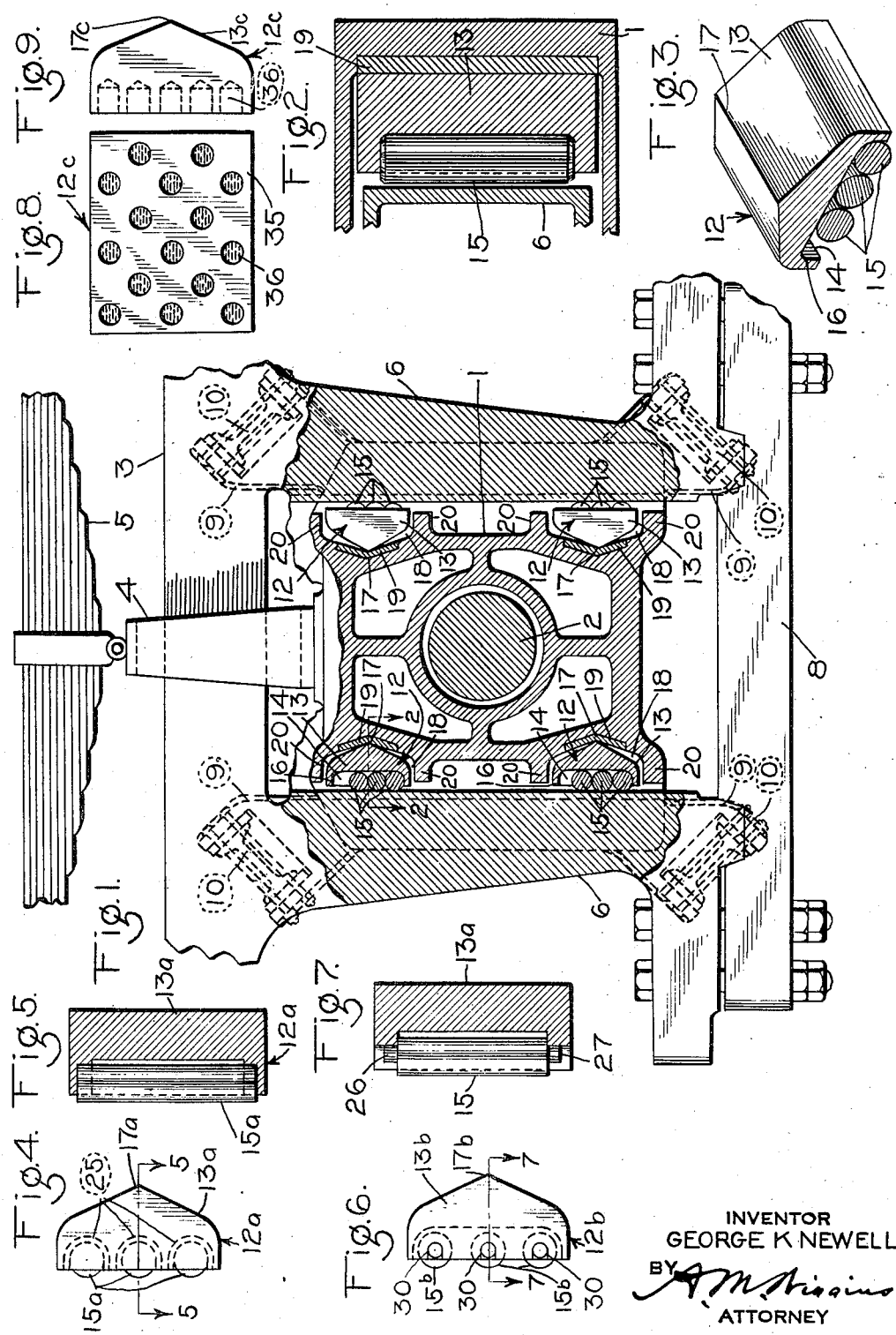
June 15, 1943. G. K. NEWELL 2,322,050
TRUCK CONSTRUCTION
Filed April 29, 1941
INVENTOR
GEORGE K NEWELL
ATTORNEY Patented June 15, 1943

UNITED STATES PATENT OFFICE 2,322,050

TRUCK CONSTRUCTION

George K. Newell, near Pitcairn, Pa., assignor to The Westinghouse Air Brake Company, Wilmerding, Pa., a corporation of Pennsylvania Application April 29, 1941, Serial No. 390,886

6 Claims. (Cl. 105—79)

This invention relates to railway locomotives and truck frames and more particularly to the journal bearing members or boxes upon which the frames are spring supported for relative vertical movement.

An object of the invention is to provide self aligning bearings between the journal bearing member or box and the pedestal legs or jaws of the locomotive or truck frame, in order to prevent as far as possible excessive and uneven wear of the pedestal legs or jaws and the journal bearing member and to also prevent binding action between the journal bearing member and the pedestal legs or jaws.

This construction is especially useful in railway locomotives or trucks of the type in which the stationary or non-rotating plates of a disk brake are carried by the journal bearing or box. A brake mechanism of this type is shown, described and claimed in a pending application of Joseph C. McCune and George K. Newell, Serial No. 357,134, filed September 17, 1940, and assigned to the assignee of the present application. In such constructions the forces due to the torque of the brake mechanism will be transmitted through the journal bearing member or box to the pedestal legs or jaws. These forces tend to rock the bearing member or box about the axle and as a result are liable to cause excessive and uneven wear of the cooperating friction surfaces of the journal bearing member or box and pedestal legs or jaws. This rocking action of the bearing member or box may also cause binding action to be set up between the journal bearing member or box and the pedestal legs or jaws.

According to the invention, the self aligning bearings which are interposed between the journal bearing member or box and the pedestal legs or jaws of the locomotive or truck frame will eliminate the above mentioned objectional features.

Other objects and advantages will appear in the following more detail description of the invention.

In the accompanying drawing

Fig. 1 is a side elevational view showing a portion of the side frame and a portion of a wheel and axle assembly, of a locomotive, and embodying the invention. The legs or jaws of the frame, the journal bearing member or box, the axle of the wheel and axle assembly and two of the self aligning anti-friction bearings are shown in section, the other two self aligning bearings being shown in elevation.

Fig. 2 is an enlarged cross sectional view of the self aligning anti-friction bearing taken on the line 2—2 of Fig. 1.

Fig. 3 is an isometric view of the shoe portion of the self aligning anti-friction bearing embodied in Fig. 1.

Fig. 4 is an enlarged view of another form of self aligning bearing shoe which may be substituted for the type shown in Fig. 1 of the drawing.

Fig. 5 is a sectional view of the form of shoe shown in Fig. 4 taken on the line 5—5.

Fig. 6 is an enlarged view of still another form of self aligning bearing shoe which may be substituted for the type shown in Fig. 1 of the drawing.

Fig. 7 is a sectional view of the form of shoe shown in Fig. 6 taken on the line 7—7.

Fig. 8 is an enlarged face view of yet another form of self aligning bearing shoe which may be substituted for the type shown in Fig. 1 of the drawing.

Fig. 9 is an end elevational view of the bearing shoe shown in Fig. 8.

As shown in the drawing, the invention is associated with a journal bearing member or box 1 of the type employed for supporting the frame of a railway locomotive or truck. For the purpose of illustration, the journal bearing member or box 1 is shown mounted on an axle 2 and is adapted to support the side frame 3 of a locomotive by means of a spring saddle 4 and a spring 5 mounted thereon which is connected in the usual manner to the side frame 3 by means of spring hangers, not shown, provided at each end of the spring 5.

The side frame 3 may be of the usual type having depending pedestal legs or jaws 6 which are spaced apart and adapted to slide in slots provided in opposite sides of the journal bearing member or box 1. The lower ends of the pedestal legs or jaws 6 are connected together below the journal bearing member or box 1 in the usual manner by means of a binder or tie bar 8.

In the present embodiment of the invention, the inner end of the journal bearing member or box 1 is provided with four equally spaced, laterally extending, arms 9 for the purpose of supporting four rigid connecting members 10 which carry the non-rotating or stationary braking elements or disks of a disk brake mechanism, in the manner fully described in the aforementioned pending application. In this arrangement the torque forces of the brake mechanism are transmitted through the journal bearing member or box 1 to the pedestal legs or jaws 6.

In accordance with the invention the journal bearing member or box 1 is made more suitable for transmission of torque forces to the pedestal legs or jaws of the side frame by means of a self aligning anti-friction bearing arrangement between the journal bearing member and the pedestal legs or jaws. As shown in Fig. 1 of the drawing, this anti-friction bearing arrangement comprises two pairs of roller bearing shoes 12 which are arranged one pair at each side of the journal bearing member 1. Each bearing shoe 12 comprises a body portion 13 having a recess 14 formed in its front face for the reception of anti-friction members which, as shown, may be in the form of rollers 15. The rollers are of such size that when assembled in the recess 14 the upper roller will be spaced away from the top inner wall 16 of the recess 14 so that the rollers will be permitted to rotate in the recess 14, as will be hereinafter described. The back of the body portion is formed to provide for rockable movement of the shoe, and as shown is preferably of inverted V-shape in cross section having its apex 17 located between the upper and lower sides of the body portion.

As shown in Figs. 1 and 2, the roller bearing shoe 12 is arranged between the journal bearing member or box 1 and the pedestal legs or jaws 6 in such a manner that the inverted V-shaped back portion will extend into an accommodating recess 18 formed in the journal bearing member or box 1. The apex 17 of the back portion of the shoe engages a hardened bearing plate 19 secured to the bearing member or box 1 within the recess 18, the other portions of the back of the shoe being out of contact with the surface of the recess. The bearing member or box 1 is also provided with a plurality of pairs of projecting lugs or stop members 20, each pair being arranged in spaced relation to the upper and lower ends of an adjacent shoe 12. These projecting lugs or stop members are provided to insure against the possibility of excessive vertical movement of the shoes relative to the bearing member or box 1, and thus effectively prevent binding action between the bearing member or box 1 and the pedestal legs or jaws 6.

With this construction it will be apparent that since there is clearance space between the ends of the shoes 12 and the lugs 20, and also between the major portion of the backs of the shoes and the adjacent inner surface of the recess 18 a certain amount of free rocking movement is permitted between the shoes and the journal bearing member or box 1. Therefore, when torque forces, due to braking or other service conditions, tend to rock the bearing member or box 1 about the axle the rollers 15 of the diagonally opposite shoes 12 will be forced into closer engagement with the pedestal jaws or legs 6, thus automatically aligning themselves with the bearing surfaces of the pedestal jaws or legs. While the torque forces are being transmitted to the pedestal jaws or legs by these two shoes the other two diagonally opposite shoes will be more or less relieved of such forces but they will nevertheless automatically align themselves with the bearing surfaces of the pedestal jaws. It will thus be noted that the roller bearing shoes 12 are automatically self aligning to maintain the friction surfaces of the rollers 15 in vertical alignment with the pedestal jaws or legs 6 and so permit the journal bearing member or box 1 to move upwardly or downwardly in the pedestal jaws or legs without binding action and excessive wear.

A locomotive or truck while in motion is constantly subjected to vertical shocks or vibrations, and due to the clearance provided between the upper roller of each shoe and the adjacent upper wall 16 of the recess 14 these shocks and vibrations, when transmitted to the rollers, cause the rollers, which are not in close contact with the bearing surfaces of the jaws, to rotate slightly. This action will prevent the same portions of the surfaces of the rollers remaining in contact with the bearing surfaces of the pedestal jaws or legs and therefore prevent the rollers from being worn out of round. This clearance space also serves to permit the rollers to rotate more freely than if they completely filled the recess 14.

The bearing shoe 12a shown in Figs. 4 and 5 is of the roller bearing type and is similar to that just described in Fig. 1, the difference consisting in the manner of housing the rollers 15a in the shoe. In this embodiment, the rollers are housed in individually spaced recesses 25 formed in the front face of the shoe 12a. As shown, the front face of the shoe 12a is provided with a plurality of spaced recesses 25, each of which is adapted to receive a roller 15a for engaging the bearing surface of the pedestal jaws or legs in the same manner as hereinbefore described in connection with Fig. 1.

Figs. 6 and 7 show another form of roller bearing shoe 12b which differs from that shown in Figs. 4 and 5 only in the manner of mounting the rollers in the shoe. In this design each roller 15b is provided with a trunnion 26 at one end of the roller and a trunnion 27 at the opposite end which trunnions are mounted in slotted openings 30 at each end of the shoe, thereby permitting the rollers to rotate.

Figs. 8 and 9 show another form of bearing shoe 12c which is of the friction type. This shoe is provided with a flat bearing surface 35 adapted to engage a bearing surface of the pedestal jaw or leg of the pedestal, and to slide upwardly or downwardly instead of roll as in the other types of bearing shoes hereinbefore described. In order to eliminate to a large degree the friction set up between the sliding surfaces of the shoe and the pedestal jaw, the bearing surface of the shoe is provided with a plurality of drilled holes 36 adapted to receive a suitable lubricant for lubricating the bearing surfaces. If desired the shoe may be made of a well known self lubricating bearing metal.

From the foregoing description it will be understood that I have provided self aligning bearings arranged between the journal bearing member or box and the pedestal legs or jaws of the locomotive or truck frame which eliminate excessive and uneven wear of the pedestal legs or jaws and the journal bearing member and which also prevent binding action between the journal bearing member and the pedestal legs or jaws.

While several illustrative embodiments of the invention have been described in detail, it should be understood that the invention is not limited to these details of construction and that numerous changes and modifications may be made without departing from the scope of the following claims.

Having now described my invention, what I claim as new and desire to secure by Letters Patent is:

1. The combination with a vehicle truck or locomotive frame construction of the type comprising a pair of spaced pedestal jaws having bearing surfaces, of axle journal means disposed between said jaws, said frame construction being movable vertically relative to said axle journal means, a bearing member for said axle journal means, said bearing member comprising a shoe having an inverted V-shaped back portion and a recess formed in its front face, anti-friction bearings disposed in said recess for engaging the bearing surface of the pedestal jaw, the apex of said back portion pivotally engaging said axle journal means.

2. Self aligning bearing means adapted to be interposed between the bearing surface of a truck pedestal jaw and a journal bearing means of a vehicle truck or locomotive construction, comprising, anti-friction members arranged to engage the bearing surface of the pedestal jaw, means for carrying said anti-friction members, said self-aligning bearing means comprising a shoe having an inverted V-shaped rear portion and a recess formed in its front face, anti-friction bearings disposed in said recess for engaging the bearing surface of the pedestal jaw, the apex of said rear portion being adapted to have pivotal engagement with said journal bearing means.

3. The combination with a vehicle truck or locomotive frame construction of the type comprising a pair of spaced pedestal jaws having bearing surfaces, of axle journal means disposed between said jaws, said frame construction being movable vertically relative to said axle journal means, a bearing member for said axle journal means interposed between one of said bearing surfaces and one side of said axle journal means, said bearing member comprising a shoe having a back portion which is of substantially inverted V-shape in longitudinal section and comprising a front bearing portion for slidable contact with the adjacent bearing surface of one of said pedestal jaws, the apex of said back portion pivotally engaging said axle journal means to render said shoe self-aligning with relation to said adjacent bearing surface.

4. The combination with a vehicle truck or locomotive frame construction of the type comprising a pair of spaced pedestal jaws having bearing surfaces, of axle journal means disposed between said jaws, said frame construction being movable vertically relative to said axle journal means, and a pair of vertically spaced separate bearing members for said axle journal means interposed between each of said bearing surfaces and the adjacent side of said axle journal means, one of said bearing members being located above and the other below the horizontal center line of said axle journal means and each having a bearing portion for operative engagement with the adjacent bearing surface of one of the pedestal jaws and having a body portion rockably associated with the adjacent side of said axle journal means to render the bearing portion vertically self-aligning with relation to said adjacent bearing surface.

5. The combination with a vehicle truck or locomotive frame construction of the type comprising a pair of spaced pedestal jaws having bearing surfaces, of axle journal means disposed between said jaws, said frame construction being movable vertically relative to said axle journal means, and a pair of bearing shoes for each side of said axle journal means one pair being interposed between one of said bearing surfaces and the adjacent side of said axle journal means and the other pair interposed between the other of said bearing surfaces and the adjacent side of said axle journal means, one of each pair of bearing shoes being located above and the other below the horizontal center line of said axle journal means and each bearing shoe having pivotal engagement with said axle journal means to render the shoe vertically self-aligning with respect to the adjacent bearing surface of the pedestal jaw.

6. Self-aligning bearing means adapted to be interposed between the bearing surface of a truck pedestal jaw and a journal bearing means of a vehicle truck or locomotive construction, said bearing means comprising a pair of bearing shoes arranged one above and one below the horizontal center line of said axle journal means, each of said shoes having a front bearing portion disposed longitudinally with respect to the bearing surface of said pedestal jaw for slidable contact therewith and each comprising means for rendering said front bearing portion vertically self-aligning with relation to said adjacent bearing surface of the pedestal jaw, said means having pivotal engagement with the axle journal means to provide for such alignment.

GEORGE K. NEWELL.